W. T. GREEN.
MACHINE FOR GROOVING BOXES.
APPLICATION FILED APR. 1, 1915.
1,190,151.
Patented July 4, 1916.
7 SHEETS—SHEET 3.
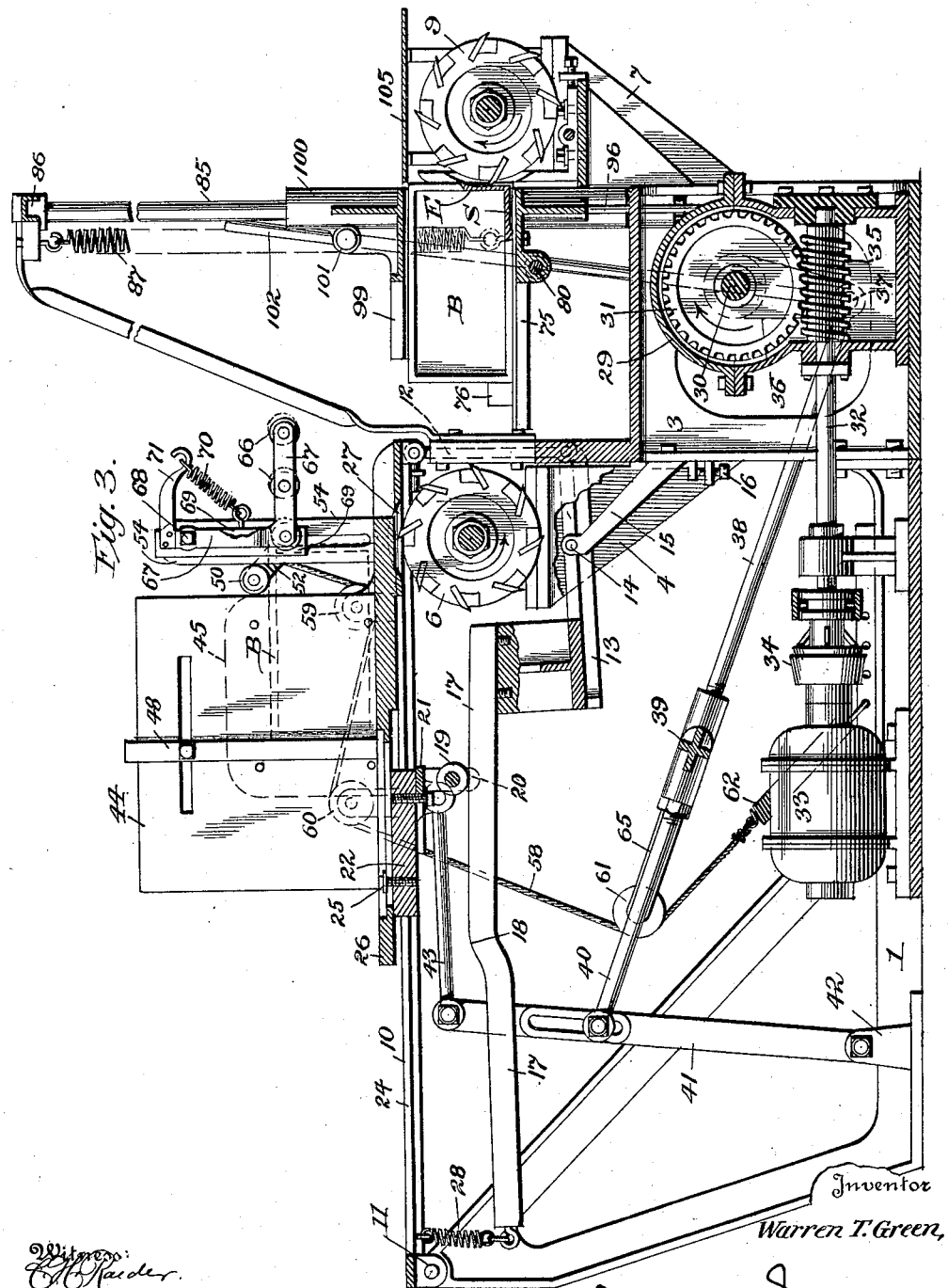

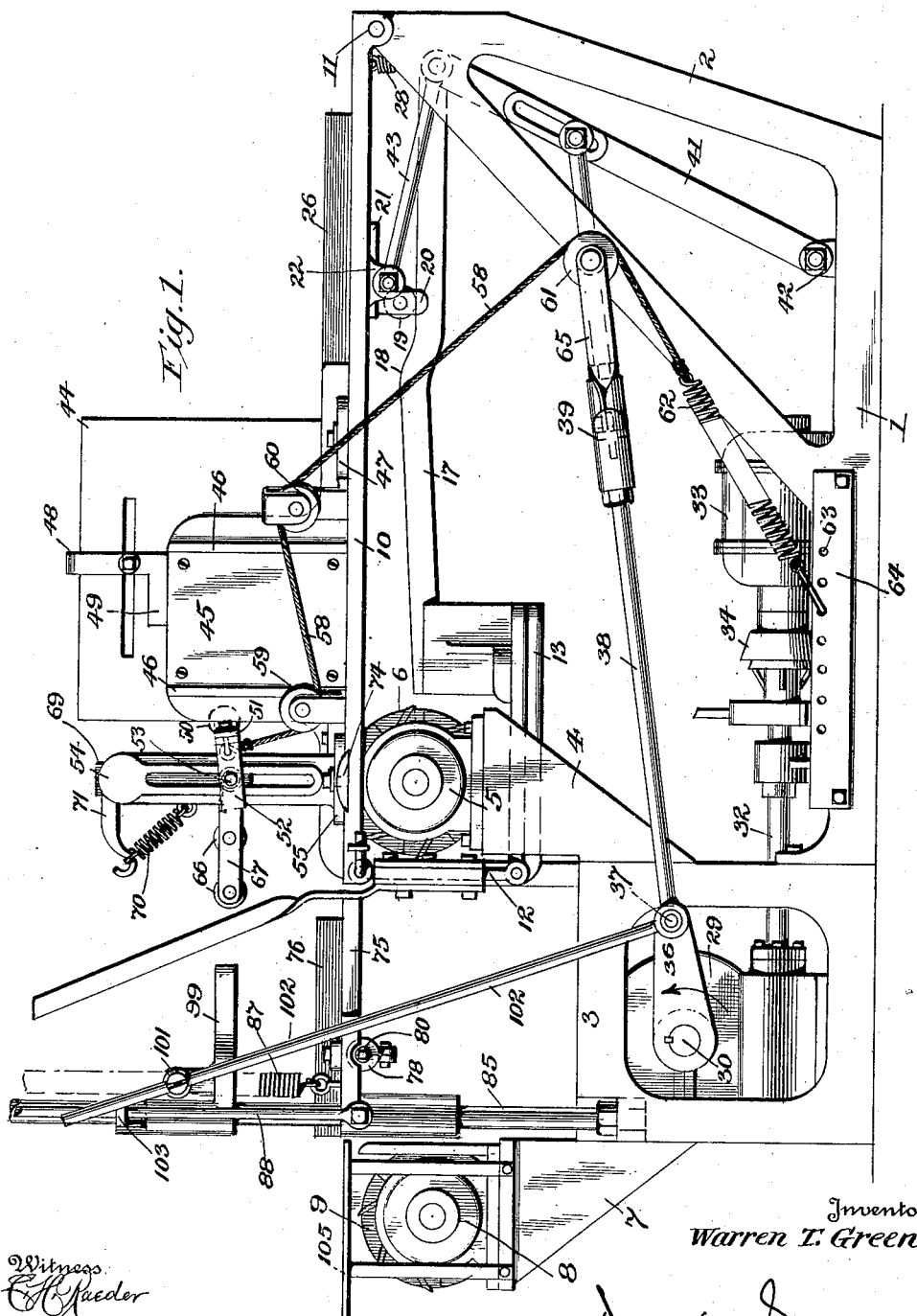

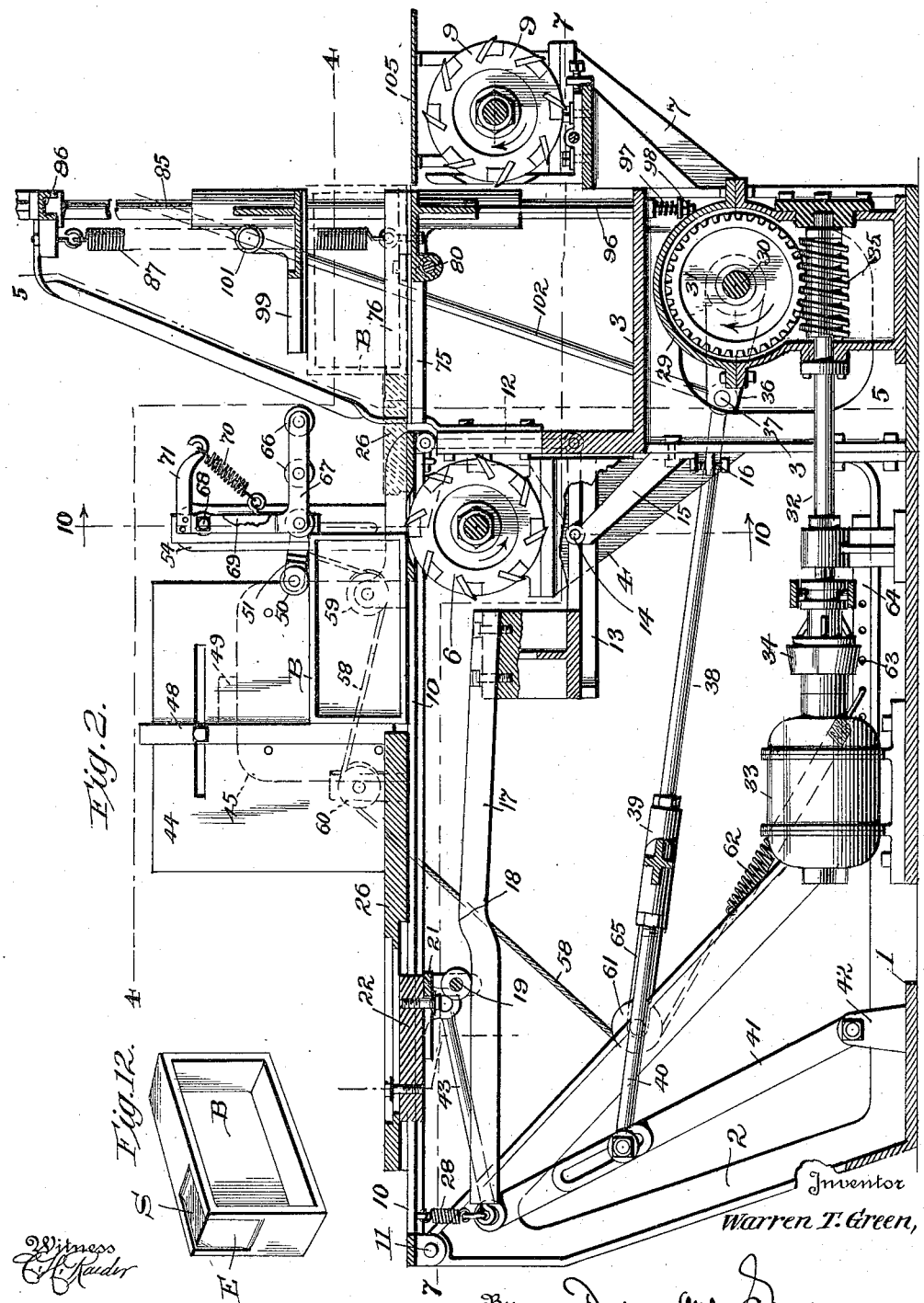

W. T. GREEN.
MACHINE FOR GROOVING BOXES.
APPLICATION FILED APR. 1, 1915.
1,190,151.
Patented July 4, 1916.
7 SHEETS—SHEET 4.
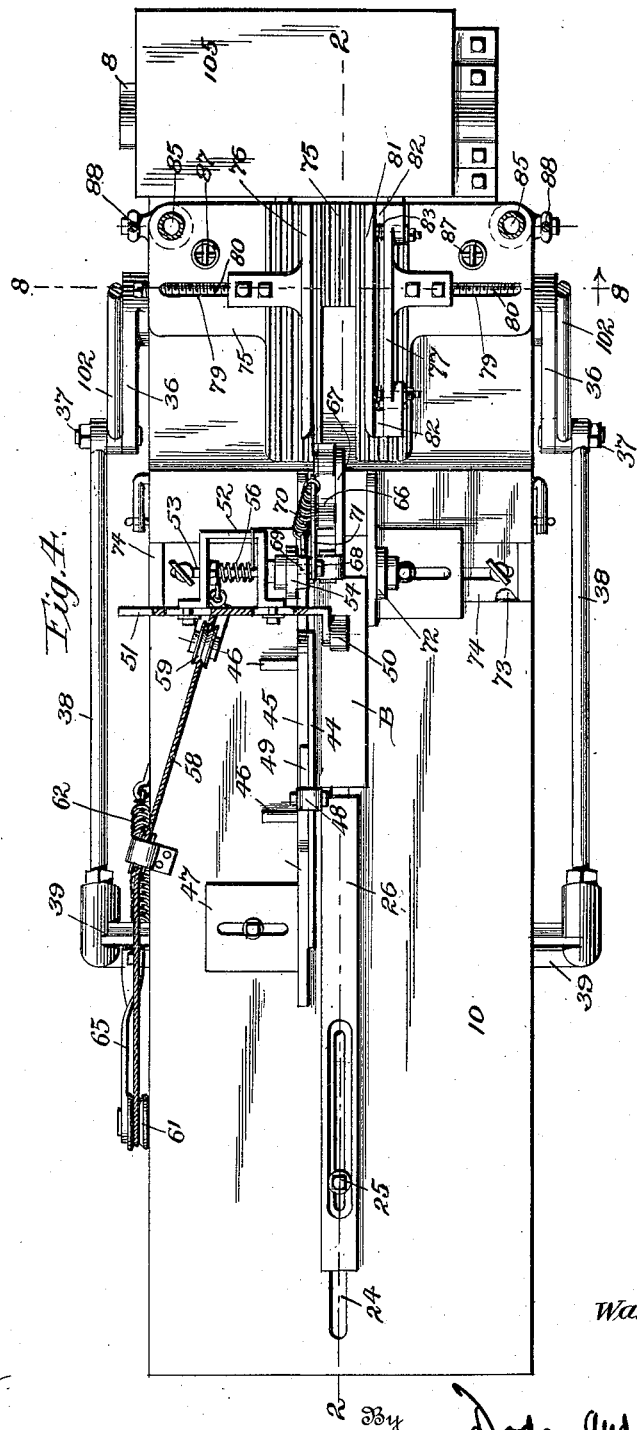
Inventor
Warren T. Green,

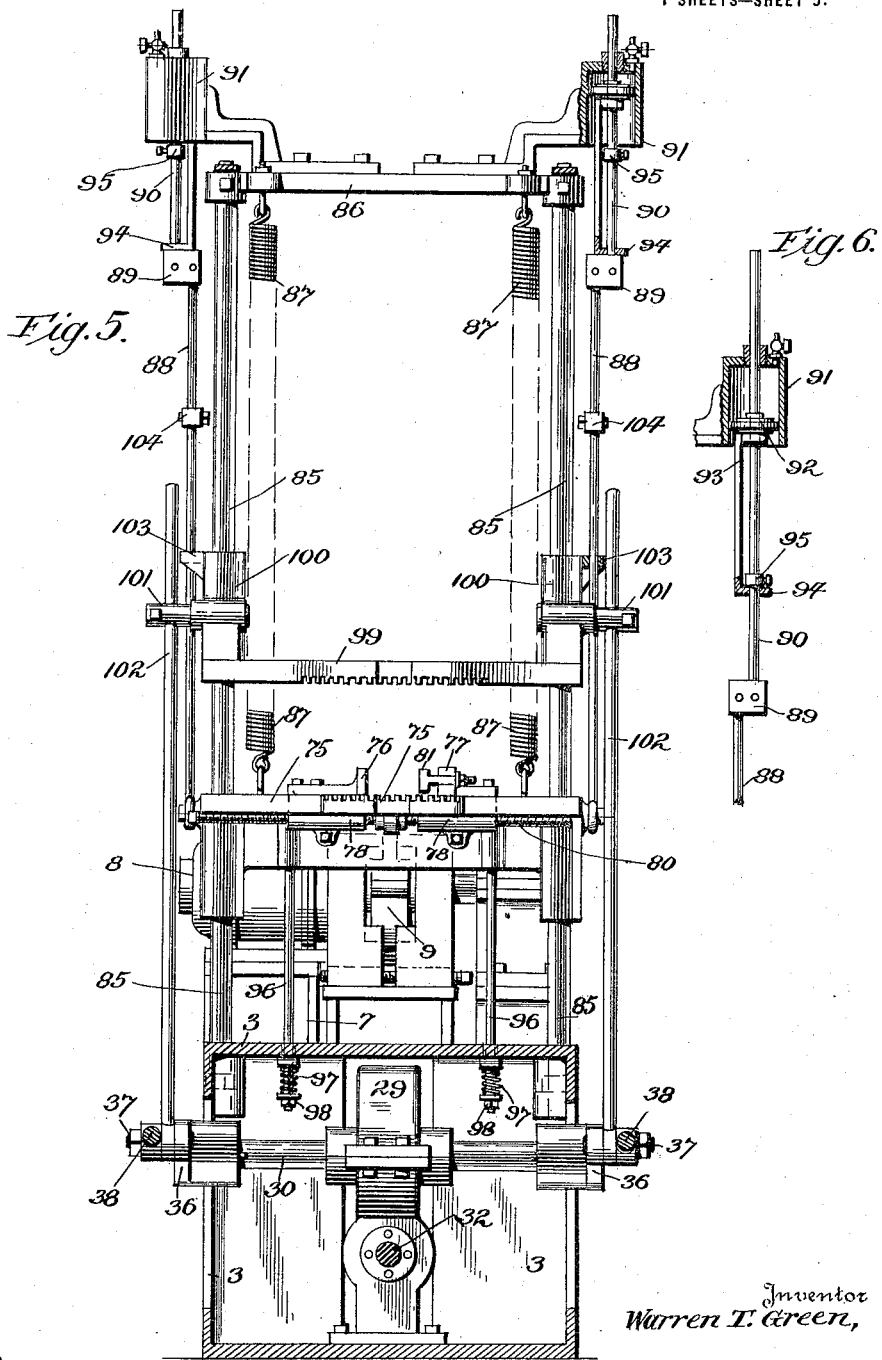

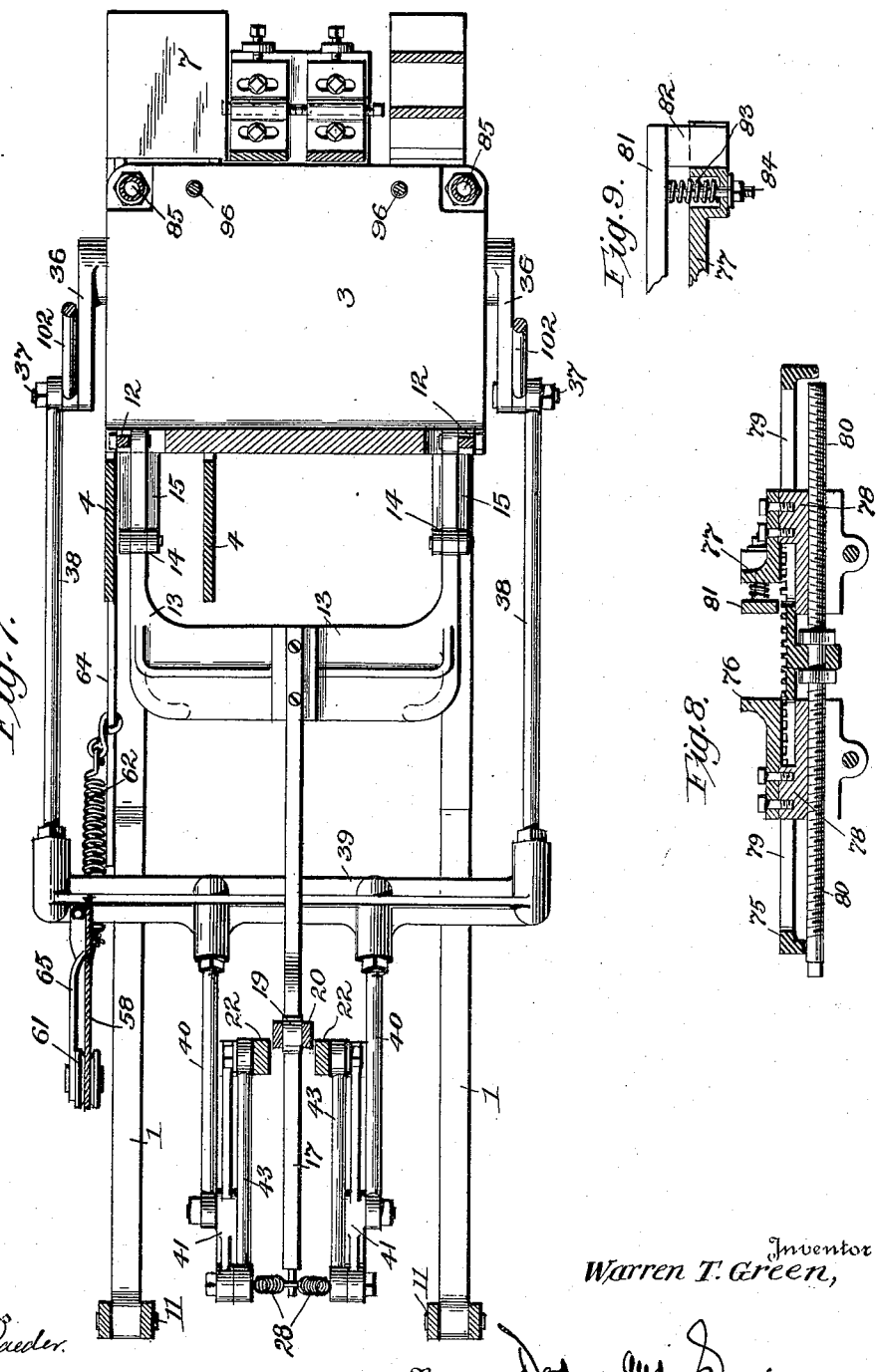

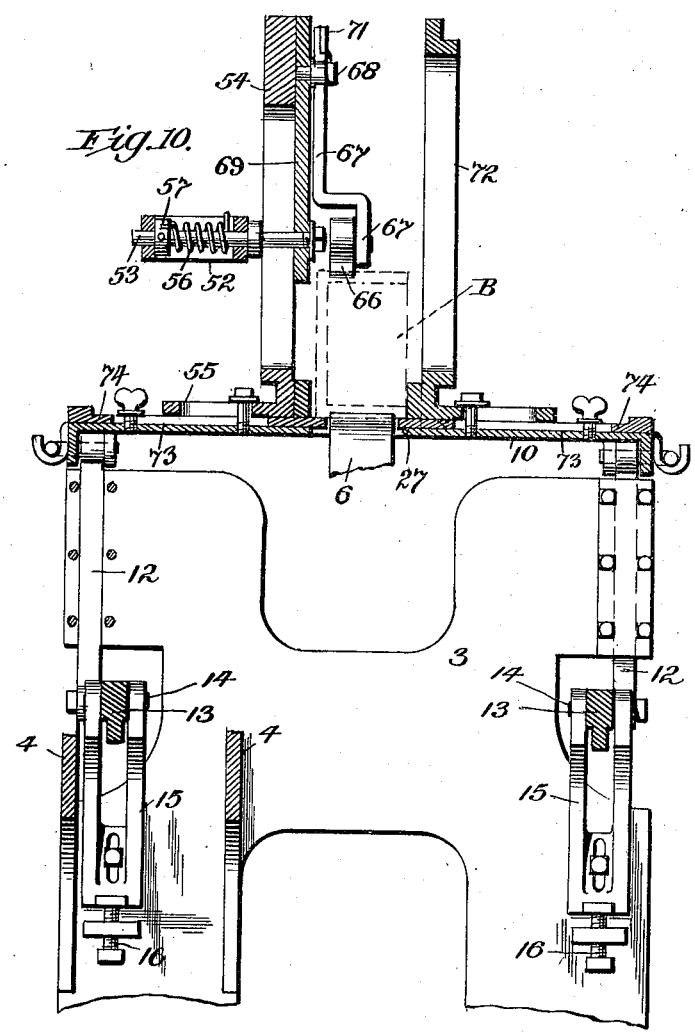
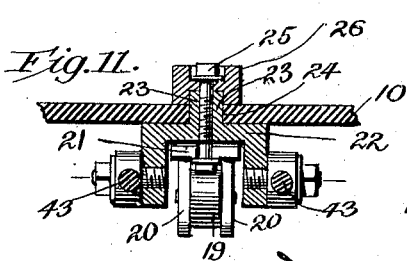

UNITED STATES PATENT OFFICE.

WARREN T. GREEN, OF LOUISVILLE, KENTUCKY, ASSIGNOR TO MENGEL BOX COMPANY, OF LOUISVILLE, KENTUCKY, A CORPORATION OF NEW JERSEY.

MACHINE FOR GROOVING BOXES.

1,190,151. Specification of Letters Patent. Patented July 4, 1916.

Application filed April 1, 1915. Serial No. 18,530.

*To all whom it may concern:*

Be it known that I, WARREN T. GREEN, a citizen of the United States, residing at Louisville, in the county of Jefferson and State of Kentucky, have invented certain new and useful Improvements in Machines for Grooving Boxes, of which the following is a specification.

My present invention pertains to an improved machine for producing grooves or seats in boxes for the reception of revenue stamps or the like.

Boxes containing articles subject to internal revenue tax must in many instances, and particularly in the case of tobacco, have a revenue stamp (or stamps) applied to the exterior face or faces thereof, in plain view. In the case of boxes containing plug tobacco, wherein the box and contents thereof are relatively heavy and subject to more or less rough handling, it becomes essential to affix the stamp (or stamps) in a seat or depression formed on the exterior of the box, preferably in the contiguous portions of a side and end, in order to protect it, and prevent its being torn off in the handling and stacking of the boxes.

The object of the invention is to produce a machine which will form such a seat or groove upon an adjacent end and side wall of a box, the action of the machine being rapid and automatic, necessitating only the placement or positioning of the boxes by the attendant upon the machine, the boxes thereafter being fed or advanced through the machine past the side and end groovers or cutters, and discharged from the machine.

Referring to the drawings: Figure 1 is a side elevation of the machine as seen from that side opposite which the attendant stands, or opposite from the feed side of the machine; Fig. 2, a vertical longitudinal section of the machine taken on the line 2—2 of Fig. 4, the parts being in that position in which a box is about to be advanced over the side cutter; Fig. 3 a similar view, the box being shown as having been positioned by the operator upon the slide while another box is shown in conjunction with the end cutter which has completed its operation; Fig. 4 a top plan view of the machine, the parts being shown in section, and taken on the line 4—4 of Fig. 2; Fig. 5 a transverse sectional view, taken on the line 5—5 of Fig. 2; Fig. 6 a detail view showing the different relations of one of the dash-pots and its allied parts; Fig. 7 a horizontal sectional view, taken on the line 7—7 of Fig. 2; Fig. 8 a detail vertical sectional view, taken on the line 8—8 of Fig. 4; Fig. 9 a detail view of one end of the clamping bar shown in Fig. 8; Fig. 10 a transverse vertical sectional view, taken on the line 10—10 of Fig. 2; Fig. 11 a transverse sectional view showing the manner of connecting the push-bar or plate employed to advance the boxes over the first or side cutter; and Fig. 12 a perspective view of a box, showing the grooves formed therein.

In the drawings, 1 denotes the base of the frame, adapted to rest directly upon or be secured to the floor, and rising from one end of said base is a pair of oppositely-disposed standards 2. A box-like framework 3 is secured to the opposite end of the base 1 and a pair of brackets 4 extend upwardly therefrom and form the support for an electric motor 5, to the shaft of which is directly secured the side cutter-head 6. A second pair of brackets, 7, also extend upwardly from the member 3 upon the opposite side from the brackets 4, and form the support for a second motor, 8, carrying the end cutter-head 9.

The main table of the machine, designated by 10, is fulcrumed at 11 at the upper end of the standards 2, and to the under face of said table, at its opposite end, there is pivotally connected a pair of downwardly-extending slides 12 (see Fig. 7) to which in turn, at their lower ends, are pivotally connected the arms of a U-shaped frame 13, which frame is fulcrumed at 14 upon a pair of brackets 15. Said brackets (see more particularly Figs. 2 and 3) are mounted upon the framework 3 and are vertically adjustable, through the agency of set-screws 16. To the upper portion of the transverse member of the frame 13 is rigidly secured an outwardly-extending arm or lever 17 which underlies the table. Said lever is of the form best shown in Figs. 2 and 3, and is provided with a cam face 18, which coacts with a roller 19 pivotally secured between a pair of ears or lugs 20 (see Fig. 11) which extend downwardly from a plate 21, secured to the under face of a slide 22. Said slide, as will be best seen upon reference to Fig. 11, is provided with an upstanding rib 23, which passes through a slot or opening 24 formed in the upper face of the table 10, see Fig. 4. The slide is adjustably secured by a bolt 25 to the under face of a push-bar 26, which rests upon the upper face of the table 10. Said table overlies the cutter head 6 and is provided with an opening 27, through which the cutter may project when the table is in its lowest position, or that shown in Fig. 2. A pair of springs 28 (see Fig. 7) is interposed between the outer or free end of the arm or lever 17 and the table, said springs acting to elevate said lever and draw the table downwardly. It will thus be seen that the table has a rising and falling motion, swinging about the fulcrum 11, the rising motion being imparted thereto as the roller 19 passes along the lever and contacts with the cam portion 18. Such elevation is maintained so long as the roller rests upon the portion of the arm or lever 17 between the cam portion 18 and the frame 13. As will be readily appreciated, as soon as the roller rides upon the cam portion said lever is depressed, and during the rocking of the frame 13 the slides 12 are moved upwardly in their guides and the free end of the table is thereby elevated.

Endwise reciprocating motion is imparted to the push-bar through the following mechanism: Mounted within the frame member 3 is a housing 29, in which is mounted a shaft 30 carrying a worm-wheel 31. A second shaft 32, driven from a motor 33 and an interposed clutch 34, also finds its bearing in the housing 29, said shaft 32 carrying a worm 35, which meshes with the worm wheel 31. The shaft 30 has secured to its opposite ends cranks 36 (see Figs. 4 and 7) and each crank carries a wrist-pin 37, to which in turn is connected an arm 38, which arms are secured to a cross-head 39, extending transversely of the machine. Projecting outwardly from the cross-head and rigidly secured thereto is a pair of arms 40, the outer ends of which are adjustably secured to a pair of levers 41, fulcrumed to brackets 42 extending upwardly from the base 1. The upper ends of said levers are in turn pivotally connected to a pair of links 43, the opposite ends of said links being pivotally connected to depending ears formed on the slide 22. It will thus be seen that for each complete revolution of the shaft 30 the push-bar 26 will be given a complete forward and rearward movement.

In the operation of the machine the operator will place a box, designated by B, upon the push-bar 26, when the parts are in the positions shown in Fig. 3, the box at such time resting upon the push-bar, which is then advanced. The box is placed in the machine on edge, with the open side (assuming that it is empty) toward the operator. The bottom of the box will, therefore, come against a vertically-disposed plate 44, while the lower face rests upon the push-bar 26. The plate 44 is secured to and carried by a vertically-disposed casting or member 45 (see Fig. 4) having vertical ribs 46, the lower ends of which bear upon the upper face of the table 10. Said member 45 is likewise provided with a slotted arm 47 by which the member, and consequently the plate 44, may be held in their adjusted positions with reference to the push-bar 26, being moved toward and from the same according to the depth of the box being operated upon and the position in which it is desired to form the groove S in the side of the box. A stop-bar 48 is adjustably mounted upon the plate 44, the bar extending over the upper end of the plate and being provided with a foot-piece 49 (see Fig. 1) which bears upon the upper edge of the casting or member 45. Said stop-bar 48 may be adjusted toward or from the cutter 6 according to the length of the box, and as the push-bar 26 is drawn rearwardly and from beneath the box the bar prevents retrograde movement of the box therewith. In order to clamp the box to the table after the push-bar is withdrawn from beneath the box and prior to its advancement to push the box along the table and over the cutter 6, a roller 50 is employed. Said roller is carried at the outer end of a bar 51 (see Fig. 4), adjustable horizontally upon a rocking frame 52. Said frame is fulcrumed upon a pin or shaft 53 (Fig. 10) which is adjustably secured in a slotted post or standard 54, which in turn is adjustably secured to the table by means of a slotted foot-piece or bracket 55, so that it can be moved toward or from the cutter. A coiled spring 56 encircles the shaft 53, one end bearing upon the frame 52 and the other being connected to a collar 57, which in turn is secured to the shaft 53. Said spring normally tends to rock the frame so as to elevate the forward portion thereof and hold the roller 50 in its highest position, or that shown in Fig. 3. Connected to the rocking frame 52 is a cord or rope 58, which passes under a pulley 59 (see Fig. 1), over a pulley 60, and around a pulley 61, the opposite or lower end of the cord being attached to a coiled spring 62. Said spring is secured in one or another of a series of openings 63 formed in a plate 64 secured to the base 1. The tension of the spring and the pull exerted upon the cord or rope can thus be adjusted and brought into proper relation with the movement of the push-bar according to its adjustment. The pulley 61 is carried by an arm 65, extending outwardly from the cross-head 39, see Fig. 7, and as the push-bar begins to move rearwardly the rope is placed under stress by the movement of the pulley 61 toward the rear of the machine, which draws the frame 52 downwardly and consequently draws the roller 50 downwardly and into contact with the upper face of the box, the parts coming to the positions shown in Fig. 2, when the push-bar is retracted. Thus, the box is held down upon the table and as the push-bar 26 moves forwardly it comes into contact with the rear end of the box and forces the same over the rotating cutter 6, which will form the groove S in the forward end of the box, as hereinbefore noted. In passing along the table the box comes beneath a series of rollers 66, carried by the lower arm of an L-lever 67, which lever is fulcrumed at 68 to a plate 69, adjustably connected to the post 54 by shaft 53, Fig. 10. Lever 67 is urged downwardly by a spring 70, one end of which is secured to the member 69, while the opposite end is connected to a finger 71 secured at its inner end to the upper portion of the lever 67, above the fulcrum 68 thereof. A second post or standard 72 is placed opposite the post 54 and is adjustable toward and from the cutter 6 in a manner similar to the post 54. As will be seen upon reference to Fig. 10, the lower portion of post 72 bears against the forward edge of the lower side of the box, while the bottom of the box, as will be seen upon reference to Fig. 4, at such time bears against the plate 44, and the box is thus held in its proper vertical position.

The table 10 (see Figs. 4 and 10) is provided with a dovetail slot or way 73, extending transversely thereof in line with the cutter 6, and a pair of plates 74 are adjustably mounted in said way toward and from said cutter, and underlie the box. These plates or slides will be adjusted according to the width of the cutter employed. When the push-bar 26 is moved forwardly to its full extent, or to the position shown in dotted lines in Fig. 2, the box in which the side groove S has been cut, will come to rest in the position shown in dotted lines in said figure, whereupon the member 26 will be retracted, the roller elevated, and the parts will assume the positions shown in Fig. 3, ready to receive another box. That box which has been grooved by the cutter 6 will come to rest upon a table or platform 75, the upper face of which is preferably grooved to prevent the box from sticking thereon if the glue employed in the construction thereof should be fresh or exude. Mounted upon the table are two guides and clamping members 76 and 77, see Figs. 4, 8 and 9, said members being secured to lugs extending upwardly from blocks 78, through slots 79 formed in the table, the blocks being reversely threaded and coöperating with a right and left hand screw 80, through the actuation of which the blocks, and consequently the guiding and clamping members 76 and 77, may be brought together or retracted as necessary, according to the dimensions of the box being operated upon. The member 77 carries a yielding presser-bar 81, held in position by guide members 82 and forced outwardly by springs 83, which encircle rods 84 extending from the member 81 and working through recesses formed in the member 77, as best shown in Fig. 9. The outer end of the member 76 and of the bar 81 are rounded, as shown in Fig. 4, in order that the box may be readily passed between the same, the springs for the bar 81 being placed under compression as the box is forced onto the table 75, and consequently the box will be clamped laterally by said members.

The table is mounted to slide upon a pair of vertically-disposed uprights or columns 85 (see Fig. 5), said uprights being secured at their lower ends in the framework 3, see Fig. 1, and connected at their upper ends by a cross-head 86. A pair of relatively heavy coiled springs 87 is connected to the table 75 and to the cross-head 86, said springs tending at all times to draw the table upwardly into its elevated position. To each side of the table there is connected a rod 88, said rod extending upwardly and being connected, through a block 89, with a second rod 90, which latter projects upwardly and passes through a dash-pot 91, and also freely through a piston 92, which works within the dash-pot. A bar 93 is connected to the lower portion of the piston, or the hub thereof, and extends downwardly, and is provided with a lateral, perforated extension 94 through which rod 90 passes. A stop-collar 95 is mounted upon the rod 90, above said laterally-extending member 94, and is designed to contact with said member when the table is forced downwardly in the manner hereinafter specified. Upon the upward movement of the table, the rod 90 will pass freely through the extension 94, and the dash-pot will not come into operation until the block 89 contacts with the member 94, and the piston is thereby forced upwardly into the dash-pot, serving to check and cushion the upward movement of the table under the stress of the springs 87. To assist in guiding the table and to prevent undue jar being imparted thereto, guide rods 96 (see Figs. 2, 3 and 5) extend downwardly from the under portion of the table, and through the upper portion of the frame 3, springs 97 encircling the lower ends of the rods and being held in position thereon by nuts 98. These rods serve to limit the upward movement of the table.

To clamp the box upon the table, and to depress the table with the box so as to carry the end of the box, which projects slightly over the end of the table 75, into contact with the cutter 9 to produce the end groove E, Fig. 12, the following mechanism is employed: A presser-plate 99, having its under face grooved, similar to the table 75, is provided with hubs 100, which hubs are mounted to slide upon the uprights 85. Journaled in bearings formed in each of the hubs is a stub-axle 101, through the outer end of which passes a pitman 102, the latter being adjustably secured in said stub-axle to provide for initial adjustment of the presser-plate 99 with reference to the table 75 according to the size of the box to be passed through the machine. The lower end of each pitman is connected to the wrist-pin 37, carried by one of the cranks 36 before mentioned, and consequently the presser-plate is raised and lowered for each complete revolution of the shaft 30. The hubs 100 are also provided with outwardly-projecting ears 103, through which the rods 88 pass, each of said rods carrying an adjustable collar 104, with which the ears 103 contact when the presser-plate 99 is raised to its highest elevation so as to insure the table 75 being carried up to its fully raised position. These ears 103 may contact with the collars slightly before the complete elevation of the presser-plate, if for any reason the table 75 is not fully elevated. The parts are so timed that when the presser-plate and secondary table 75 have reached their elevated positions and said secondary table is in line with the main table 10, the box (which has a groove formed in its side) will be advanced by the push-bar 26 along the table 10 and onto the secondary table 75, and will push the box which is then resting upon the table 75 off of the same and onto a platform 105, mounted above the end cutter 9. The push-bar will then be retracted, the operator will place another box in position with reference to the first cutter, and the cycle of operations will be repeated.

Having thus described my invention, what I claim is:

1. In a machine for the purpose described, the combination of a pair of cutters adapted to form seats in the adjacent side walls of a box; means for advancing the box past one cutter; means for securing a relative separation of the box and cutter when said advancing means has moved a predetermined distance; and means for thereafter advancing the box into working relation with the second cutter in a path at right angles to its movement past the first cutter.

2. In a machine for the purpose described, the combination of a pair of cutters, means for advancing a box over one of said cutters to form a groove in one face thereof; and means acting to clamp the box and carry it downwardly and upwardly into and out of contact with the second cutter.

3. In a machine for the purpose described, the combination of a table; means for advancing a box from one end thereof and discharging it at the other; a cutter; and means for effecting a relative separation of the table and cutter when the advancing means has moved the box a predetermined portion of its travel along the table and maintaining such separation until the box is passed from the table.

4. In a machine for the purpose described, the combination of a table; means for advancing a box from one end thereof and discharging it at the other; a cutter; and means for moving the table away from the cutter when the advancing means has moved the box a predetermined portion of its travel along the table and maintaining such separation until the box is passed from the table.

5. In a machine for the purpose described, the combination of a table, pivoted at one end; a cutter located below the table at the opposite end; means for advancing a box along the table in one direction and discharging the same therefrom; and means for tilting the free end of the table upwardly when said advancing means has moved a predetermined distance and maintaining such relation until the box is discharged.

6. In a machine for the purpose described, the combination of a table pivoted at one end; a cutter located below the table at the opposite end; means for advancing a box along the table in one direction and discharging the same therefrom; and means actuated by said advancing means for tilting the table when the advancing means has moved a predetermined distance.

7. In a machine for the purpose described, the combination of a table pivoted at one end; a vertically-slidable support for the opposite end; a cutter located adjacent the free end of the table; means for advancing a box along the table; and means extending from the support into the path of movement of the advancing means and adapted to be actuated thereby to raise the slidable support and consequently the table.

8. In a machine for the purpose described, the combination of a table pivotally supported at one end; a vertically-slidable support for the opposite end; a cutter located at said end of the table; a pivoted arm extending outwardly from said slidable support beneath the table, said arm having a cam face; means for advancing a box along the table; and a member carried by said means and coöperating with the arm to depress the outer end of the same when said advancing means has moved a predetermined distance.

9. In a machine for the purpose described, the combination of a table pivotally supported at one end; a cutter located adjacent the opposite end of the table; means for periodically raising the free end of the table; a second rising and falling table located at the free end of the first table; a cutter located at one side of the path of movement of said second table; means for clamping a box upon said second table; and means for advancing a box along the first table, over the first-named cutter, and onto the second table.

10. In a machine for the purpose described, the combination of a table; a cutter coöperating therewith to form a groove in one side of a box; a second spring-sustained table normally standing in line with the discharge end of the first table; a clamping member located above said second table; means for raising and lowering said clamping member; a second cutter located to one side of the path of movement of said second table; and means for advancing a box along the first table and onto the second table.

11. In a machine for the purpose described, the combination of a table; a cutter; a push-bar movable back and forth on the table; a vertically-disposed stop-bar to prevent retrograde movement of a box to be grooved; a presser roller adapted to bear upon the upper portion of the box; and means working in timed relation with the push-bar to draw the roller down into operative position.

In testimony whereof I have signed my name to this specification in the presence of two subscribing witnesses.

WARREN T. GREEN.

Witnesses:
H. P. ADKITS,
V. H. BRYAN.

Copies of this patent may be obtained for five cents each, by addressing the "Commissioner of Patents, Washington, D. C."